United States Patent
Prause et al.

(10) Patent No.: US 9,399,414 B2
(45) Date of Patent: Jul. 26, 2016

(54) VEHICLE SEAT HAVING A PLURALITY OF FITTINGS

(75) Inventors: Markus Prause, Coburg (DE); Andi Langguth, Coburg (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 118 days.

(21) Appl. No.: 13/817,415

(22) PCT Filed: Jul. 29, 2011

(86) PCT No.: PCT/EP2011/003818
§ 371 (c)(1),
(2), (4) Date: Mar. 26, 2013

(87) PCT Pub. No.: WO2012/022425
PCT Pub. Date: Feb. 23, 2012

(65) Prior Publication Data
US 2013/0175842 A1    Jul. 11, 2013

(30) Foreign Application Priority Data
Aug. 16, 2010   (DE) .......................... 10 2010 039 361

(51) Int. Cl.
*B60N 2/00* (2006.01)
*B60N 2/20* (2006.01)
(Continued)

(52) U.S. Cl.
CPC .. *B60N 2/20* (2013.01); *B60N 2/22* (2013.01); *B60N 2/2252* (2013.01); *B60N 2/2356* (2013.01); *B60N 2205/35* (2013.01); *B60N 2205/50* (2013.01)

(58) Field of Classification Search
CPC ........... B60N 2/22; B60N 2/2213; B60N 2/20

USPC ....... 297/354.1, 354.12, 361.1, 367 R, 378.1, 297/378.12
See application file for complete search history.

(56) References Cited

U.S. PATENT DOCUMENTS 4,889,386 A * 12/1989 Kochy et al. .................. 297/359
5,746,476 A    5/1998 Novak et al.
(Continued)

FOREIGN PATENT DOCUMENTS

| CN | 1733524 A | 2/2006 |
|---|---|---|
| CN | 101778737 A | 7/2010 |

(Continued)

OTHER PUBLICATIONS

English translation of International Preliminary Report on Patentability for International Application No. PCT/EP2011/003818, dated Feb. 19, 2013, 5 sheets.
(Continued)

*Primary Examiner* — Laurie K Cranmer
(74) *Attorney, Agent, or Firm* — Lewis Roca Rothgerber Christie LLP

(57) ABSTRACT

A vehicle seat is provided. The vehicle seat comprising a seat member, a backrest member which is connected to the seat member so as to be able to be pivoted about a pivot axis, a first fitting which, when viewed along the pivot axis, is arranged at a first position on the seat member and a second fitting which, when viewed in the direction of the pivot axis, is arranged at a second position on the seat member for a pivotable connection of the backrest member with the seat member. The vehicle seat further comprising a third fitting which, when viewed along the pivot axis is arranged between the first fitting and the second fitting and which is spaced apart from the first fitting and the second fitting along the pivot axis.

17 Claims, 2 Drawing Sheets

(51) Int. Cl.
*B60N 2/22* (2006.01)
*B60N 2/225* (2006.01)
*B60N 2/235* (2006.01)

(56) References Cited

U.S. PATENT DOCUMENTS

| | | | |
|---|---|---|---|
| 5,775,780 A * | 7/1998 | Murphy et al. | 297/473 |
| 6,095,608 A * | 8/2000 | Ganot et al. | 297/367 R |
| 6,491,346 B1 * | 12/2002 | Gupta et al. | 297/452.65 |
| 7,073,861 B2 * | 7/2006 | Ichikawa et al. | 297/378.1 |
| 7,077,463 B2 * | 7/2006 | Sun et al. | 297/15 |
| 7,168,763 B2 * | 1/2007 | Lee | 297/364 |
| 7,188,903 B2 * | 3/2007 | Finner et al. | 297/362 |
| 7,434,885 B2 * | 10/2008 | Becker et al. | 297/378.12 |
| 7,695,068 B2 | 4/2010 | Maeda et al. | |
| 8,360,529 B2 * | 1/2013 | Armbruster | 297/378.12 |
| 8,702,170 B2 * | 4/2014 | Abraham et al. | 297/341 |
| 2005/0168035 A1 * | 8/2005 | Boudinot | 297/378.1 |
| 2005/0225143 A1 * | 10/2005 | Sun et al. | 297/378.1 |
| 2006/0033372 A1 * | 2/2006 | Lee | 297/378.1 |
| 2008/0191539 A1 * | 8/2008 | Teufel et al. | 297/452.18 |
| 2010/0187878 A1 | 7/2010 | Funk et al. | |
| 2011/0260516 A1 * | 10/2011 | Li | 297/354.12 |
| 2013/0057043 A1 * | 3/2013 | Ngiau et al. | 297/378.1 |

FOREIGN PATENT DOCUMENTS

| | | | | |
|---|---|---|---|---|
| DE | 3628587 | A1 | 4/1998 | |
| DE | 10063192 | A1 | 7/2002 | |
| DE | 10142981 | A1 | 3/2003 | |
| DE | 10311869 | A1 | 9/2004 | |
| DE | 102004013271 | A1 | 10/2005 | |
| DE | 102006015558 | B3 | 2/2008 | |
| DE | 102007011874 | A1 | 9/2008 | |
| DE | 102008028102 | A1 | 12/2009 | |
| DE | 102008047660 | A1 | 4/2010 | |
| EP | 2210773 | A1 | 7/2010 | |
| JP | 06166353 | A * | 6/1994 | B60N 2/30 |
| WO | WO 2010/030660 | A1 | 3/2010 | |

OTHER PUBLICATIONS

Chinese Search Report for application No. 2011800396287, dated Sep. 23, 2014 (7 pages), and English translation (2 pages).
Chinese Office action for Application No. 201180039628.7, dated Jun. 24, 2015 with English translation (19 pages).
Chinese Office action for Application No. 201180039628.7 dated May 18, 2016 with English translation, 10 pages.
Search Report from the Patent Office of the People's Republic of China for Application No. 201180039628.7 dated May 10, 2016 with English translation, 4 pages.

* cited by examiner

VEHICLE SEAT HAVING A PLURALITY OF FITTINGS

CROSS-REFERENCE TO A RELATED APPLICATION

This application is a National Phase Patent Application of International Patent Application Number PCT/EP2011/003818, filed on Jul. 29, 2011, which claims priority of German Patent Application Number 10 2010 039 361.4, filed on Aug. 16, 2010.

BACKGROUND

The invention relates to a vehicle seat.

Such a vehicle seat has a seat member, a backrest member which is connected to the seat member so as to be able to be pivoted about a pivot axis, a first fitting which, when viewed along the pivot axis, is arranged at a first position on the seat member and a second fitting which, when viewed in the direction of the pivot axis, is arranged at a second position on the seat member. The two fittings serve to pivotably connect the backrest member to the seat member and may, for example, be constructed as rotary fittings for rotatable connection or as catch fittings for engaging connection of the seat member to the backrest member.

A type of construction of a rotary fitting which can be used to connect the seat member to the backrest member is known, for example, from DE 10 2008 028 102 A1.

One possible construction type of a catch fitting can be seen, for example, in DE 10 2008 047 660 A1.

In conventional vehicle seats, for example, a front vehicle seat, a fitting is arranged in each case at different sides of a seat member, when viewed along the pivot axis, between the seat member and the backrest member. Thus, a fitting is generally arranged at a door side of the vehicle seat and another fitting at the opposing, so-called tunnel side, which is located towards the center of the vehicle. The fittings serve to adjust the backrest member relative to the seat member, a rotary fitting pivoting the backrest member relative to the seat member by means of continuous rotation, whilst a catch fitting in an engaged state fixes the backrest member in position relative to the seat member and can be unlocked in order to pivot the backrest member relative to the seat member.

In rear seats, for example, bench type rear seats, fundamentally similar arrangements can be used, there being arranged at each of the two sides of a seat member of the bench type rear seat a fitting, which connect a backrest member to the seat member.

In a vehicle seat known from DE 10 2006 015 558 B3, at one side of a seat member a catch fitting and a rotary fitting are arranged in series so that, by the rotary fitting being actuated, a backrest member can be continuously pivoted relative to the seat member and the inclination of the backrest member can be adjusted whereas, by the catch fitting being actuated, the backrest member can be freely pivoted.

In a vehicle seat known from U.S. Pat. No. 7,695,068 B2, two fittings in the form of rotary fittings are arranged at a side of a seat member at which significant loading forces are introduced by connecting a safety belt and must be absorbed. The doubling of the fittings at one side of the seat member enables forces which occur at this side to be better absorbed.

SUMMARY

The problem addressed by the present invention is to provide a vehicle seat which enables an advantageous introduction of force from a backrest member into a seat member and adequate strength to receive even large loads with the simplest possible construction type of the fittings used.

According to an exemplary embodiment of the invention, a vehicle seat has a third fitting which, when viewed along the pivot axis, is arranged between the first fitting and the second fitting and which is spaced apart from the first fitting and the second fitting along the pivot axis.

The notion of the present invention is to use one or more additional fittings for connecting a backrest member to a seat member of a vehicle seat, the additional fittings between the fittings which are conventionally provided and which are assembled, for example, when viewed along the pivot axis, at a first side of the seat member and at an opposing second side of the seat member, being arranged with spacing from these conventional fittings so that, between the outer fittings, another support of the backrest member is provided relative to the seat member.

An additional third fitting may be provided. However, it is also conceivable to use two or more additional fittings, for example, three or four additional fittings, in order to provide a multiple support for the backrest member relative to the seat member along the pivot axis and to achieve uniform, advantageous introduction of force from the backrest member into the seat member.

The first fitting and the second fitting are connected, for example, to a frame member of the seat member and a frame member of the backrest member, the frame members being able to be constructed as an integral component of the frame structure of the vehicle seat, but also as adapter components for adapted fitting of the fittings to the frame of a vehicle seat. The third fitting is then advantageously connected to a frame member of the seat member and a frame member of the backrest member, these frame members for connecting the third fitting differing from the frame members to which the first fitting and the second fitting are connected. Consequently, the first fitting is connected to a first frame member of the seat member and a first frame member of the backrest member, the second fitting is connected to a second frame member of the seat member and a second frame member of the backrest member and the third fitting is connected to a third frame member of the seat member and a third frame member of the backrest member, the frame members being different from each other so that the third fitting is connected to the seat member and the backrest member at a different location spaced apart from the other two fittings.

The third fitting can preferably be arranged on the seat member at a position of a belt connection location. This is particularly advantageous when the vehicle seat is constructed as a vehicle rear seat or bench type rear seat for a vehicle in which a plurality of belt connection locations may be provided along the bench. Using the additional third fitting, an additional support of the backrest member relative to the seat member can be provided an a location where, as a result of the belt forces acting, particularly large loading forces must be supported and absorbed.

For example, the first fitting and the second fitting may be spaced apart from each other by a distance along the pivot axis, the third fitting being spaced apart from the first fitting by from 0.2 to 0.8 times the distance, preferably by from 0.35 to 0.65 times the distance.

For example, the third fitting may be spaced apart from the first fitting by 0.6 times the distance. In this specific embodiment, an arrangement is produced in which there is provided between the third fitting and the first fitting a spacing of 60% of the entire distance between the first fitting and the second fitting, and between the third fitting and second fitting a spacing of 40% of the distance between the first fitting and second fitting. Such a distribution is, for example, conceivable and advantageous in the case of a bench type rear seat in which a hatch portion of the backrest member can be pivoted forward separately as a loading hatch, the additional third fitting being provided for particular support of the remaining backrest portion of the backrest member and being able to be arranged at the interface between the hatch portion and the backrest portion.

If another, additional, fourth fitting is provided, it is arranged in the same manner as the third fitting between the first fitting and the second fitting and spaced apart from the first fitting, the second fitting and the third fitting along the pivot axis. The arrangement may be selected in such a manner that the first fitting and the second fitting are each spaced apart by from 0.2 to 0.45 times the distance from the next fitting along the pivot axis. An arrangement is produced in which two additional fittings are arranged between the two outer fittings, there being provided between the outer fittings and the nearest inner fitting a spacing of from 0.2 to 0.45 times the entire spacing of the two outer fittings from each other.

For example, the spacings of the fittings may be in each case 0.33 times the distance so that an even distribution of the fittings along the pivot axis is achieved. However, it is also conceivable for the first fitting and the second fitting to each be spaced apart from the next fitting along the pivot axis by 0.4 times the distance so that the two outer fittings are each spaced apart from the next inner fitting by 0.4 times the distance and the two inner fittings have a mutual spacing of 0.2 times the distance.

The fittings may each be constructed in a functionally identical manner as rotary fittings, the fittings in this instance being able to be connected to a shaft which extends along the pivot axis in order to actuate the fittings. In order to pivot the backrest member relative to the seat member in an electromotive manner, an electrical actuation device may then be provided in the form of an electric motor, which device is operationally connected to the shaft for driving and which rotates the shaft in order to pivot the backrest member relative to the seat member and thereby actuates the rotary fittings.

In another exemplary embodiment, it is also conceivable for the fittings each to be constructed as catch fittings which are also connected to each other by means of a shaft and which can be actuated by means of the shaft, the catch fittings being unlocked when the shaft is actuated, for example, manually by means of a Bowden cable or by means of a rod assembly which is coupled to hand-operated lever, or in an electromotive manner by means of an electrical actuation device, and the backrest member thus being able to be freely pivoted relative to the seat member.

In still another exemplary embodiment, it is also possible for the first fitting and the second fitting to be constructed as rotary fittings and for the third fitting and optionally also additional fittings which are provided and which are arranged between the first fitting and the second fitting to be constructed as catch fittings. The first fitting and the second fitting may in this instance each be connected to a shaft which extends along the pivot axis in order to actuate the fittings, the shaft not being connected to the third fitting and the additional fittings where applicable. In order to actuate the third fitting and the fittings which may further be provided, a Bowden cable or a rod assembly for unlocking the (catch) fittings is provided instead.

In order to pivot the backrest member, in this instance, on the one hand, the additional fittings, which are provided between the first fitting and the second fitting and which are constructed as catch fittings, are unlocked by means of the Bowden cable or the rod assembly, and the first fitting and the second fitting, which are constructed as rotary fittings, are actuated and driven by means of the shaft so that the backrest member is pivoted about the pivot axis by means of the first fitting and the second fitting.

The pivoting is consequently carried out by means of the first fitting and the second fitting. The additional fittings which are arranged between the first fitting and the second fitting are used only for support, for example, when the backrest is raised in the locked state.

The actuation of the first and second fitting (in the form of rotary fittings) and the additional fittings which are arranged therebetween (in the form of catch fittings) is carried out in a controlled, mutually corresponding, synchronized manner, a synchronization being able to be carried out mechanically, for example, in such a manner that, when the first and second fittings are actuated, the fittings which are located therebetween (in the form of catch fittings) are unlocked automatically via the shaft, for example, via a Bowden cable or a rod assembly.

There may be provision for the fittings to be constructed in a structurally identical manner, that is to say, fittings having the same functional principle (catching or rotary fittings) to be used with identical components so that simple production of the fittings with the same components is achieved in accordance with the principle of identical elements. The individual fittings may have smaller dimensions than in conventional arrangements in which only two fittings for connecting a backrest member to a seat member are provided by the support of the backrest member relative to the seat member being distributed over more than two fittings.

It is also conceivable in another embodiment for both external fittings, that is to say, the first fitting and the second fitting, to be constructed in a structurally identical manner, but for the additional fittings which are arranged between the first fitting and the second fitting to have smaller dimensions so that the additional fittings are constructed to support smaller forces.

In a transposed embodiment, it is also conceivable for the two external fittings, that is to say, the first and the second fitting to have smaller dimensions than the additional fittings in each case.

In both cases, the fittings used may use the same functional principle, that is to say, may be constructed as catch fittings or rotary fittings, it is also being conceivable to construct the different fittings in accordance with different functional principles, that is to say, to use, on the one hand, catch fittings and, on the other hand, rotary fittings, as has been described above.

BRIEF DESCRIPTION OF THE DRAWINGS

The notion forming the basis of the invention is intended to be explained in greater detail below with reference to the embodiments illustrated in the Figures.

DETAILED DESCRIPTION

Figure 1:
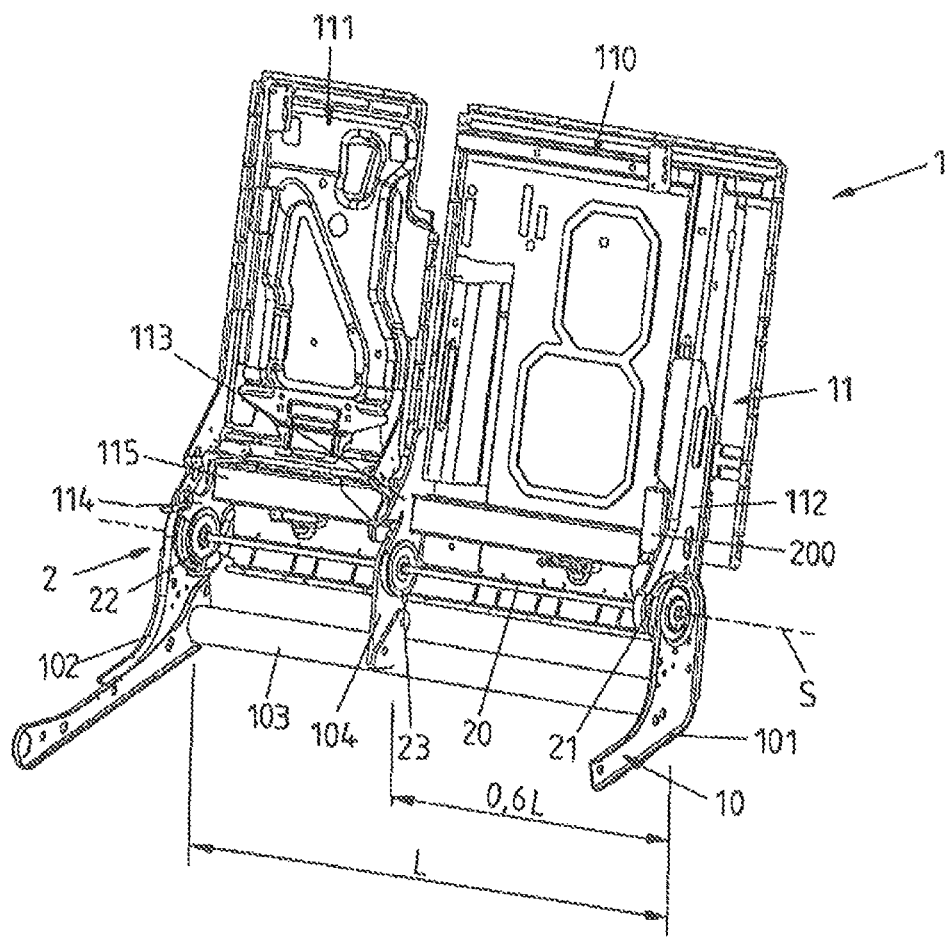
FIG. 1 shows a perspective view of a vehicle seat in the form of a bench type rear seat having three fittings for pivotably connecting a backrest member to a seat member.

In a vehicle seat 1 which is illustrated as a perspective view in FIG. 1 in the form of a bench type rear seat, a backrest member 11 comprising a backrest portion 110 and a hatch portion 111, which can be pivoted separately from this backrest portion 110 in order to form a loading hatch, is coupled to a seat member 10 so as to be able to be pivoted about a pivot axis S.

FIG. 1 shows only frame members 101, 102 of the seat member 10 which may be firmly connected to a vehicle base but which may also be longitudinally displaceable over guide rails which extend in the longitudinal direction of a vehicle.

The backrest member 11 is pivotably coupled to the seat member 10 by means of a first fitting 21 and a second fitting 22, the first fitting 21 being connected to a first frame member 101 of the seat member 10 and a first frame member 112 of the backrest member 11 and the second fitting 22 being connected to a second frame member 102 of the seat member 10 and a second frame member 114 of the backrest member 11.

In the embodiment illustrated, the fittings 21, 22 are constructed as rotary fittings and are connected to each other by means of a shaft 20, there being provided in order to actuate the fittings 21, 22 an actuation device 200 in the form of an electric motor which displaces the shaft 20 in a rotation movement in order to pivot the backrest member 11 relative to the seat member 10 and which thereby adjusts the fittings 21, 22.

In order to additionally support the backrest member 11 relative to the seat member 10, there is provided a third fitting 23 which is also constructed as a rotary fitting and which is coupled to the shaft 20. The third fitting 23 is arranged between the first fitting 21 and the second fitting 22 when viewed along the pivot axis S and is connected to a third frame member 104 in the form of an adapter member of the seat member 10 and a third frame member 113 of the backrest member 11.

The third frame member 104 of the seat member 10 is arranged on a transverse pipe 103 which extends between the frame member 101, 102 of the seat member 10, for example, in a state butt-welded to the transverse pipe 103 or screwed thereto. The third frame member 113 of the backrest member 11 is an integral component of the backrest portion 110 and is connected to the first frame member 112 and the second frame member 114 of the backrest member 11 by means of a transverse member 115.

When viewed along the pivot axis S, the third fitting 23 is in each case spaced apart from the fittings 21, 22 which are arranged at the outer side. The spacing between the outer fittings 21, 22 corresponds to a distance L, whilst the spacing between the first fitting 21 and the third fitting 23 corresponds to 0.6 times the distance L and accordingly the spacing between the second fitting 22 and the third fitting 23 corresponds to 0.4 times the distance L.

As a result of the provision of the third fitting 23, the backrest member 11 is additionally supported at the location at which the hatch portion 111 abuts the backrest portion 110 in order to form the loading hatch.

At the third frame member 113 of the backrest member 11 or the frame member 104 of the seat member 10, a belt connection location may additionally be provided so that belt forces which are introduced thereby can be supported and absorbed via the additional third fitting 23.

In principle, other arrangements of the third fitting 23 are also conceivable and possible. For example, the spacing of the third fitting 23 relative to the first fitting 21 may correspond to 0.5 times the distance L so that the third fitting 23 is arranged centrally between the first fitting 21 and the second fitting 22.

Advantageously, the third fitting 23 is fitted at a location where, on the one hand, forces must be supported and, on the other hand, an advantageous connection to the frame structure of the vehicle seat 1 is possible.

If the vehicle seat 1 is supported so as to be able to be longitudinally displaced over guide rails, the third frame member 104 of the seat member 10 can also be connected to a guide rail, for example, butt-welded thereto (and not as illustrated in FIG. 1 connected to a transverse pipe 103).

Figure 2:
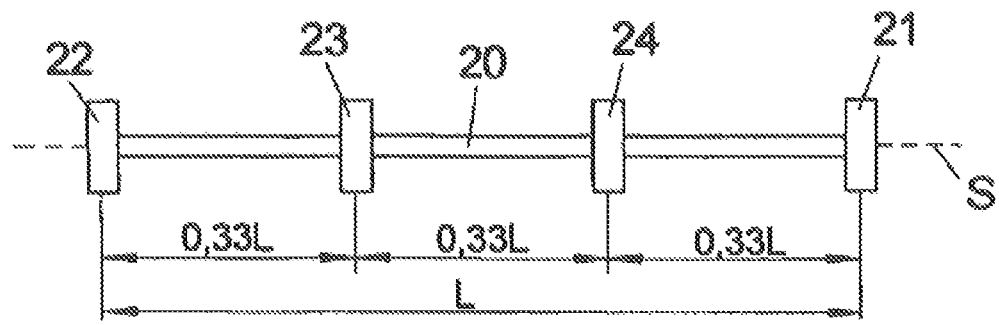
FIG. 2 shows a schematic view of four fittings for pivotably connecting a backrest member to a seat member.
Figure 3:
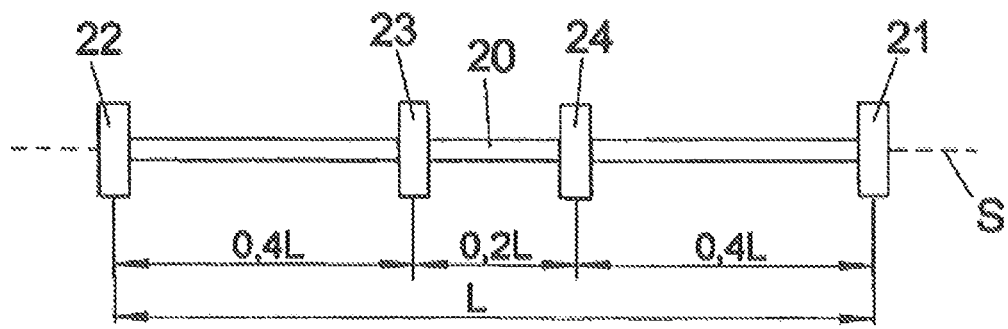
FIG. 3 shows a schematic view of four fittings, having different spacings from those in FIG. 2, for pivotably connecting a backrest member to a seat member.

It is also conceivable and possible, in place of an additional third fitting 23, to use a plurality of additional fittings 23, 24, as illustrated schematically in FIGS. 2 and 3.

In the arrangement according to FIG. 2, there are provided four fittings 21, 22, 23, 24 which are each constructed as rotary fittings and which are connected to each other by means of a shaft 20 for actuation. The spacing between the individual fittings 21, 22, 23, 24 corresponds in each case to 0.33 times the distance L between the two outer fittings 21, 22.

The arrangement according to FIG. 3 is substantially the same as the arrangement according to FIG. 2, with the difference that the spacing between the first fitting 21 and the next fitting 24 along the pivot axis S corresponds to 0.4 times the distance L, as does the Spacing between the second fitting 22 and the next fitting 23. The spacing between the additional inner fittings 23, 24 accordingly corresponds to 0.2 times the distance L.

Other distributions are also possible and are preferably selected in accordance with the force distribution and such locations at which high loading forces may occur.

In the embodiments illustrated, the fittings 21, 22, 23, 24 are constructed as rotary fittings. However, it is also conceivable to construct the fittings 21, 22, 23, 24 generally as catch fittings which, in the engaged state, lock the backrest member 11 to the seat member 10 and which can be unlocked in order to pivot the backrest member 11 relative to the seat member 10.

It is also conceivable to construct the two outer fittings 21, 22 as rotary fittings but to construct the additional inner fittings 23, 24, which are located therebetween, as catch fittings, the outer fittings 21, 22 being actuated by means of the shaft 20 and the inner fittings 23, 24 being actuated, for example, by means of a separate Bowden cable (in this case the inner fittings 23, 24 are not connected to the shaft 20).

The notion on which the invention is based is not limited to the embodiments set out above, but can in principle also be implemented in other embodiments. For example, a larger number of additional fittings, for example, three or more additional fittings, can also be used in order to provide support locations distributed along the pivot axis S for the backrest member 11 relative to the seat member 10 and to achieve an introduction of force from the backrest member 11 into the seat member 10 that is distributed in the most uniform manner possible. The arrangement of the catch fittings can be adapted in a selective manner to the loading which occurs so that support is provided in particular in those regions in which large loading forces can occur.

It is also conceivable in this context to size the individual fittings differently, that is to say, for example, to construct the outer fittings so as to be large in order to absorb large forces, but to construct the inner fittings so as to be small in order to absorb smaller forces (a transposed sizing also being able to be conceivable and advantageous).

The invention claimed is:
1. A vehicle seat comprising
a seat member,
a backrest member which is connected to the seat member so as to be pivotable about a pivot axis with respect to the seat member,
a first fitting which, when viewed along the pivot axis, is arranged at a first position on the seat member and a second fitting which, when viewed in the direction of the pivot axis, is arranged at a second position on the seat member for a pivotable connection of the backrest member with the seat member, a third fitting which, when viewed along the pivot axis, is arranged between the first fitting and the second fitting and which is spaced apart from the first fitting and the second fitting along the pivot axis, wherein the first fitting is connected to a first frame member of the backrest member, the second fitting is connected to a second frame member of the backrest member, and the third fitting is connected to a third frame member of the backrest member, wherein the first frame member, the second frame member and the third frame member of the backrest member are connected to each other such that the first frame member, the second frame member and the third frame member of the backrest member are pivoted together when pivoting the backrest member relative to the seat member upon actuating the first fitting, the second fitting and the third fitting, wherein the first fitting is connected to a first frame member of the seat member, the second fitting is connected to a second frame member of the seat member, and the third fitting is connected to a third frame member of the seat member, wherein the first frame member of the seat member and the second frame member of the seat member are connected to each other by a transverse pipe extending from the first frame member of the seat member to the second frame member of the seat member, and wherein the third frame member of the seat member is supported on the transverse pipe in that the third frame member of the seat member is butt-welded to the transverse pipe or is screwed to the transverse pipe.

2. The vehicle seat as claimed in claim 1, wherein the third fitting is arranged on the seat member at a position of a belt connection location.

3. The vehicle seat as claimed in claim 1, wherein the first fitting and the second fitting are spaced apart from each other by a first distance along the pivot axis and the third fitting is spaced apart from the first fitting by a second distance lying in a range between 0.2 and 0.8 times the first distance.

4. The vehicle seat as claimed in claim 3, wherein the second distance equals 0.6 times the first distance.

5. The vehicle seat as claimed in claim 1, wherein a fourth fitting, when viewed along the pivot axis, is arranged between the first fitting and the second fitting, and is spaced apart from the first fitting, the second fitting and the third fitting along the pivot axis.

6. The vehicle seat as claimed in claim 5, wherein the first fitting and the second fitting are spaced apart from each other along the pivot axis by a first distance, wherein the first fitting is spaced apart from the third fitting by a second distance in the range between 0.25 and 0.45 times the first distance, and the second fitting is spaced apart from the fourth fitting by a third distance in the range between 0.25 and 0.45 times the first distance.

7. The vehicle seat as claimed in claim 6, wherein the second distance and the third distance equal 0.33 times the first distance.

8. The vehicle seat as claimed in claim 6, wherein the second distance and the third distance each equal 0.4 times the first distance.

9. The vehicle seat as claimed in claim 1, wherein each of the fittings are each constructed as rotary fittings.

10. The vehicle seat as claimed in claim 9, wherein the fittings are connected to a shaft which extends along the pivot axis in order to actuate the fittings.

11. The vehicle seat as claimed in claim 10, further comprising an electrical actuation device for driving the shaft.

12. The vehicle seat as claimed in claim 1, wherein the first fitting and the second fitting are constructed as rotary fittings and the third fitting and optionally additional fittings are constructed as catch fittings.

13. The vehicle seat as claimed in claim 12, wherein the first fitting and the second fitting are connected to a shaft which extends along the pivot axis in order to actuate the fittings.

14. The vehicle seat as claimed in claim 1, wherein each of the fittings are structurally identical.

15. The vehicle seat as claimed in claim 1, wherein the first fitting and the second fitting are structurally identical and the third fitting and optionally additional fittings have smaller dimensions.

16. The vehicle seat as claimed in claim 1, wherein the first fitting and the second fitting are structurally identical and the third fitting and optionally additional fittings have larger dimensions.

17. The vehicle seat as claimed in claim 1, wherein the first fitting and the second fitting are spaced apart from each other by a first distance along the pivot axis and the third fitting is spaced apart from the first fitting by a second distance lying in a range between 0.35 and 0.65 times the first distance.

* * * * *